United States Patent [19]

Mima

[11] 4,033,160
[45] July 5, 1977

[54] BICYCLE LOCK

[76] Inventor: James J. Mima, 1351 Bluebell St., Oxnard, Calif. 93030

[22] Filed: Mar. 8, 1976

[21] Appl. No.: 664,919

[52] U.S. Cl. .................... 70/233; 70/49; 70/227

[51] Int. Cl.² ........................ B62H 5/00

[58] Field of Search ......... 70/29, 30, 45, 46, 49, 70/58, 59, 113, 114, 115, 116, 225, 226, 227, 228, 233, 234, 235, DIG. 63; 211/5

[56] References Cited

UNITED STATES PATENTS

| | | | |
|---|---|---|---|
| 436,800 | 9/1890 | Parke | 70/227 |
| 440,949 | 11/1890 | Fuller | 70/227 X |
| 458,832 | 9/1891 | Hohoff | 70/227 X |
| 527,418 | 10/1894 | Free et al. | 70/227 X |
| 695,458 | 3/1902 | Hulzer et al. | 70/46 X |
| 1,242,848 | 10/1917 | Pale | 70/227 |
| 1,270,690 | 6/1918 | Burger | 70/227 |
| 2,140,489 | 12/1938 | Wise | 70/234 X |
| 3,611,760 | 10/1971 | Mother | 70/18 |
| 3,906,758 | 9/1975 | Hurwitt | 70/233 X |
| 3,965,709 | 6/1976 | Belke | 70/227 |

FOREIGN PATENTS OR APPLICATIONS

| | | | |
|---|---|---|---|
| 977,152 | 11/1950 | France | 70/227 |
| 609,897 | 1/1935 | Germany | 70/227 |
| 335,096 | 2/1920 | Germany | 70/59 |
| 577,205 | 5/1933 | Germany | 70/227 |
| 616,301 | 7/1935 | Germany | 70/227 |
| 880,789 | 5/1953 | Germany | 70/49 |
| 377,841 | 1/1940 | Italy | 70/58 |
| 23,601 | 9/1897 | United Kingdom | 70/227 |

*Primary Examiner*—Roy D. Frazier
*Assistant Examiner*—Thomas J. Holko
*Attorney, Agent, or Firm*—Ralph B. Pastoriza

[57] ABSTRACT

The bicycle lock includes a housing structure secured to the frame of the bicycle under the seat adjacent to the rear bicycle wheel. A C-shaped member is pivoted to the housing structure for movement from an unlocked position to a locked position wherein the member passes under the rear tire and rim portion of the wheel. In addition, the housing includes a spring-loaded cable with one end exposed which can be pulled from the housing and looped about a stationary object such as a post and then re-inserted through an entrance opening in a side of the housing so that the wheel of the bicycle is not only locked against rotation but the bicycle itself is secured to a stationary object. A single cylinder-tumbler type key operated lock functions to simultaneously release the C-shaped member from its locked position and the one end of the cable from the entrance opening.

4 Claims, 4 Drawing Figures

BICYCLE LOCK

This invention relates generally to bicycle locks and more particularly to an improved bicycle lock construction providing a double locking protection to minimize the risk of bicycle theft.

BACKGROUND OF THE INVENTION

Numerous different types of bicycle locks are well known in the art. Two basic types are presently in use. First, a lock which can be placed about a frame portion of the bicycle and one of the bicycle wheels to prevent rotation of the wheel and thus render it impossible to ride the bicycle. Second, a housing structure secured to the bicycle and including a coiled cable, one end of which is exposed so that the same can be looped about a stationary object and relocked to the housing, thereby preventing physical removal of the bicycle itself from the area.

Both of the foregoing types of locks serve to diminish the risk of bicycle theft. However, certain disadvantages nevertheless exist in the available prior art types of locks. In the case of a simple padlock or bicycle lock, the same is generally separated from the bicycle when not in use and thus can become lost. This type lock is usually difficult to store by attachment to the bike and furthermore it does not prevent theft by physically carrying the bike away. The same situation obtains for cable type locks unless the housing incorporating the cable is secured to the frame of the bicycle. In this latter event, while it may be difficult to cut the cable, a thief oftentimes can simply remove the bracket structures securing the housing itself to the bicycle. Neither the padlock nor the cable type of lock provides for quickly securing and releasing bicycles for the frequent short periods of time when the bike may be left unattended.

It would be desirable to provide a bicycle lock which incorporates the useful features of both of the basic types of locks discussed above and yet in which the problems associated therewith are avoided.

BRIEF DESCRIPTION OF THE PRESENT INVENTION

With the foregoing in mind, the present invention contemplates an improved bicycle lock wherein in essence a single locking structure serves to secure a wheel of the bicycle against rotation and also secure a cable which can be looped about a stationary object in a locked condition so that a double locking of the bicycle is achieved. In addition, the structure is so designed that when in a locked condition, the fastening means for securing the lock to the bicycle are rendered inaccessible.

More particularly, in its broader aspects, the bicycle lock includes a housing structure with a swingable member pivoted in the housing structure for movement from an unlocked position to a locked position wherein the member passes under a wheel tire and rim portion of the bicycle. A spring loaded cable is stored in the housing with one end exposed so that the cable may be pulled from the housing and looped about a stationary object, the housing including an entrance opening for receiving the said one end of the cable.

A single locking means which may be key operated within the housing functions to lock the swingable member in its locked position and the one end of the cable within the housing. When unlocked, both the member and cable are released simultaneously.

In accord with a feature of this invention, when the swingable member is in its locked position, portions of the member eclipse fastening openings used to secure the housing to the bicycle frame so that it is not possible for a person to gain access to these openings and remove the housing.

BRIEF DESCRIPTION OF THE DRAWINGS

A better understanding of this invention will be had by referring to the accompanying drawings in which.

DETAILED DESCRIPTION OF THE INVENTION

Figure 1:
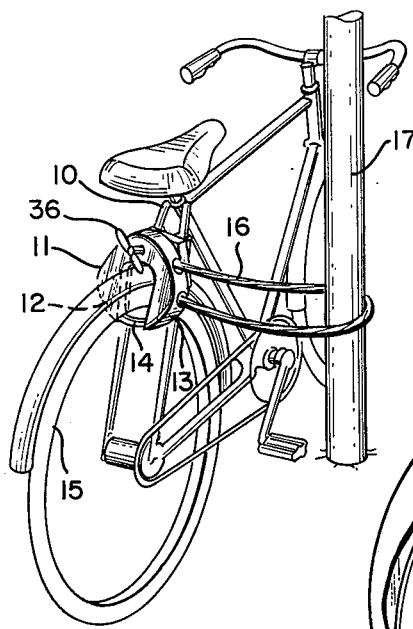
FIG. 1 is a perspective view of a bicycle secured to a stationary post by the lock of this invention.

Referring first to FIG. 1, there is shown a bicycle frame 10 to which a housing structure 11 is secured. This housing structure includes first and second legs 12 and 13 extending downwardly in a given position to straddle opposite sides of the adjacent rim and tire portion of the rear wheel. A C-shaped member, a portion of which is shown at 14, is pivoted within the housing and arranged to swing from an unlocked position in the lower end of the first leg 12 to a locked position in the lower end of the second leg 13 thereby locking the rear wheel 15 against rotation.

In addition, a cable 16 is coiled within the housing 11 and has one end extending from a side of the housing such that the cable can be pulled from the housing and looped about a stationary object such as the post 17. As will become clearer as the description proceeds, the second leg 13 of the housing 11 has an entrance opening for receiving the one end of the cable and locking the same within the housing.

Figure 2:
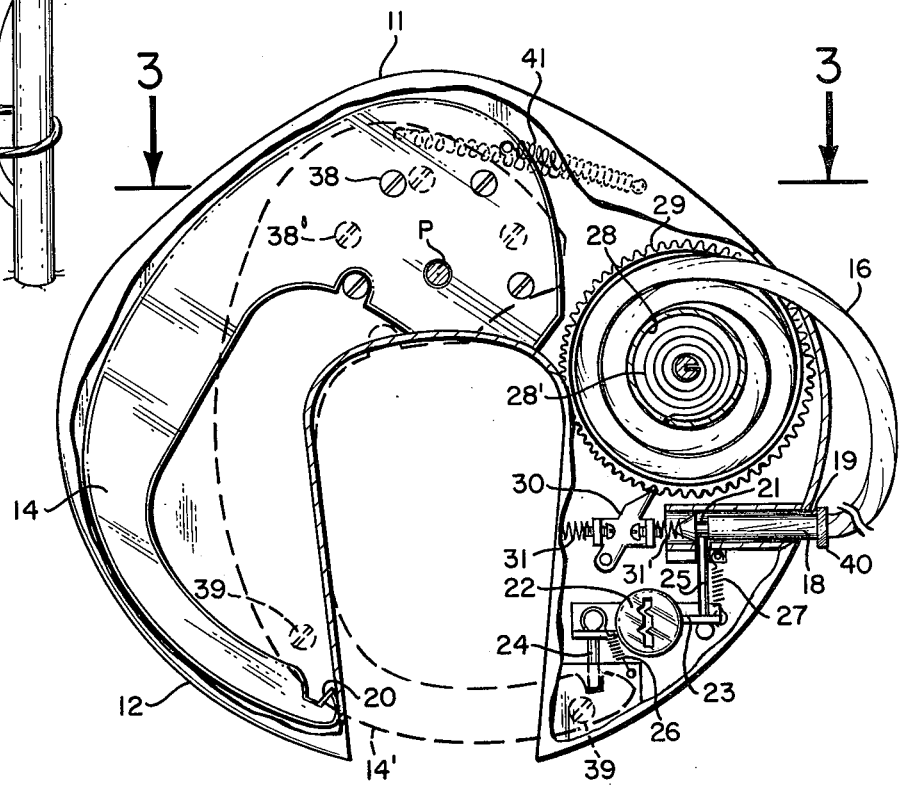
FIG. 2 is a greatly enlarged cut-away view of the lock itself showing various components making up the locking structure.

Referring now to FIG. 2, further details of the components within the housing 11 will be evident. As shown in the right hand portion of FIG. 2, the one end of the cable 16 is identified by the numeral 18 and is receivable within an entrance opening 19 in the second leg 13 of the housing 11.

FIG. 2, the C-shaped member 14 is shown in its unlocked position in solid lines and in its locked position in dotted lines. The lower arm portion of the C-shaped member 14 includes a notch 20. The end portion 18 of the cable includes an annular groove 21.

The locking means comprises a cylindrical tumbler type key operated lock 22 arranged to swing a lever 23 secured to the cylinder. This lock also includes bolts 24 and 25 coupled to opposite ends of the lever 23 and held in position by springs 26 and 27 respectively. The ends of the bolts 24 and 25 are received in the notches 20 and 21 as a result of the spring loading of the bolts.

With the foregoing arrangement, separate or simultaneous locking of the C-shaped member and one end 18 of the cable in the second leg 14 of the housing can be accomplished. Thus, when the C-shaped member is swung from its unlocked position to its locked position, it automatically depresses the spring loaded bolt 24. As the C-shaped member continues to enter the housing leg 13, the spring 26 forces the bolt 24 into the notch 20 in the C-shaped member thereby securing it.

Similarly, when the end portion 18 of the cable is inserted into opening 19, it depresses the spring loaded bolt 25. As the member 18 continues to enter the opening 19, the spring 27 forces the bolt 25 into the annular groove or notch 23 thereby securing it.

Still referring to FIG. 2, it will be noted that the cable 16 is coiled within the housing 11 on a spool 28 provided with peripheral gear teeth 29. A small pawl 30 spring biased by spring 31 is positioned to be moved against the spring bias by the end 18 of the cable 16 when received in the entrance opening 19 in such a manner as to cause the pawl to engage a tooth on the gear teeth 29 preventing rotation of the spool 28 in a counterclockwise direction; that is, in a direction permitting further cable 16 to be withdrawn from the housing 11. On the other hand, the pawl will permit counterclockwise rotation of the spool 28 and rotation of the spool in this direction is biased by an appropriate coil spring 28'. Thus, slack can be taken up in the cable 16 even after the cable has been locked but the provision of slack is not possible without releasing the end of the cable within the entrance opening.

Figure 3:
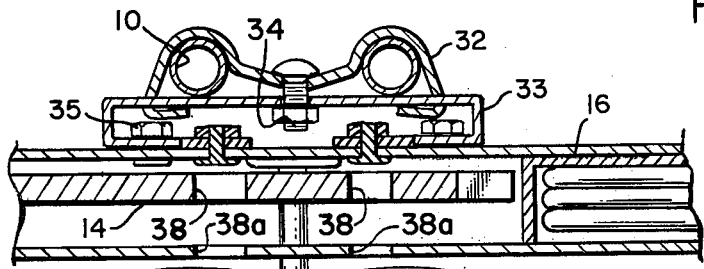
FIG. 3 is a fragmentary cross section taken in the direction of the arrows 3—3 of FIG. 2; and, FIG. 4 is an exploded fragmentary perspective view of a bracket means for securing the lock to the bicycle.

Referring to FIG. 3 there is illustrated bracket means in the form of members 32 and 33 arranged to engage the frame portion 10 of the bicycle and be secured thereto as by a bolt and nut arrangement 34. Further fastening means for securing the housing 11 to the bracket are shown at 35.

FIG. 3 also illustrates the top edge of the C-shaped member 14 and the coiled cable 16. A handle 36 is shown connected to the C-shaped member 14 for manually swinging this member about the pivot point P of FIG. 2 between its unlocked solid line position and its locked dotted line position.

Figure 4:
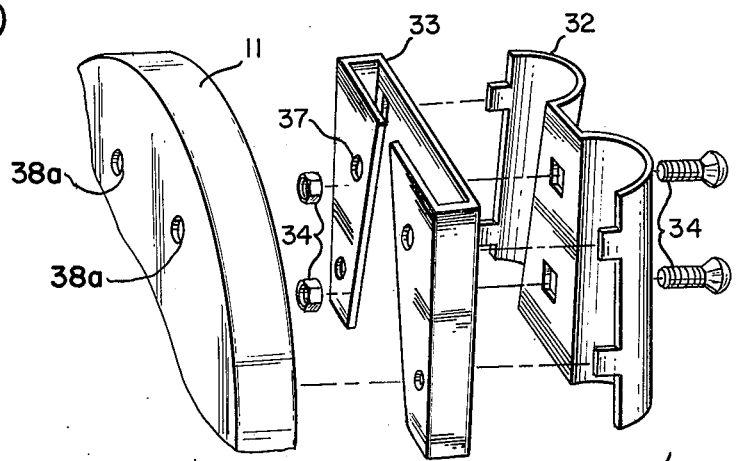

FIG. 4 illustrates the bracket means 32 and 33 and it will be noted that in the bracket member 33 there are provided fastening openings such as indicated at 37 for connection of the housing 11 to the bracket.

In the embodiment illustrated, there are provided four such fastening openings 37 and with reference back to FIG. 2, the heads of the fastening means in the form of screws are visible in these openings. In this respect, the C-shaped member 14 is provided with access openings or areas such as indicated at 38 which will expose the fastening openings when the C-shaped member 14 is in its unlocked solid line position. The two legs 12 and 13 of the housing 11 may be further fastened to the frame as by screws 39 when the lock is in its unlocked position. Screws 39 are eclipsed by the C-shaped member 14 when it is in its locked position.

With the foregoing arrangememt, suitable fastening means in the form of bolts or nuts, cross slotted screws or Allen-head screws or any equivalent fastening means may be provided to secure the housing 11 to the bracket 33 of FIG. 4 by access through registering openings 38a in the housing and the opening 38 in the C-shaped member when in its unlocked position. Actually, any type of bracket attached to the frame may serve.

When the housing is properly secured, and the C-shaped member swung from its unlocked position to its dotted line locked position, it will be noted that areas of the C-shaped member will eclipse the fastening openings and fastenings themselves, the shift in the position of the access opening 38, by way of example, being indicated at 38' in FIG. 2. Thus, once the bicycle lock is in its locked state, it is not possible for a person to attempt to remove the housing since there is no means that the person can gain access to the fastening means.

OPERATION

The operation of the lock of this invention will be evident. Once the housing 11 is secured to the bicycle frame, it will aways remain in position for convenient use.

When a person desires to lock his bicycle, he need only rotate the handle 36 of FIG. 3 in a counterclockwise direction to swing the C-shaped member 14 to its dotted line position wherein the bolt 24 will snap into the notch 20.

The use of the cable is optional. If there is a stationary object close by, the person can simply pull the one end of the cable from the housing and loop it about the object and insert it in the entrance opening 19 wherein it will automatically be locked by the snapping in of the bolt 25 in the groove or notch 21. In this respect, the biasing springs 26 and 27 as shown will bias the bolts towards the notches.

To unlock the lock, it is a simple matter to insert the key in the tumbler lock 22 of FIG. 2 and rotate the cylinder in a clockwise direction, thereby swinging the lever 23 in a direction to pull the bolts 24 and 25 upwardly and downwardly respectively thereby removing their ends from the corresponding notches 20 and 21. Both the C-shaped plate member and the cable will thus be released simultaneously by a single motion of the lock.

The coiled wind up spring 28' for the spool 28 as described in FIG. 2 will automatically retract the cable 16. The one end 18 of the cable includes a shoulder 40 to prevent the cable from being completely drawn into the housing so that this end will always be exposed at the entrance for easy grasping when the lock is to be re-used. The C-shaped member when released from its locked position will be returned by means of a spring 41 shown in FIG. 2, which holds it normally in its open position.

As described, it is not possible for a person to remove the housing from the bicycle when the bicycle lock is in its locked condition since access to the fastening means is eclipsed by the locked position of the C-shaped member.

From the foregoing description, it will thus be evident that the present invention has provided a greatly improved bicycle lock in which certain disadvantages inherent in prior art structures are avoided.

What is claimed is:

1. A bicycle lock comprising, in combination:
   a. a housing having first and second legs extending downwardly in a given position to straddle opposite sides of a tire and rim portion of the bicycle wheel;
   b. a C-shaped member pivotally mounted in an upper part of said housing such that the lower arm of the member can swing from an unlocked position in the lower end of said first leg of the housing into a locked position in the lower end of the second leg of the housing underneath said tire and rim of said bicycle wheel so that the tire and rim are wholly surrounded by the combination of the legs of the housing and the lower arm of the C-shaped member;
   c. a cable coiled within said housing with one end extending from a side of the housing such that the cable can be pulled from the housing and looped about a stationary object, said second leg of said housing having an entrance opening for receiving said one end of the cable; and d. a single locking means in said second leg operable to separately or simultaneously lock the lower arm end of said C-shaped member and the one end of said cable in said second leg, and simultaneously unlock the same when operated whereby said bicycle is secured against theft.

2. A bicycle lock according to claim 1, including a bracket means for securing said housing in said given position to a frame portion of said bicycle, said bracket means being secured to said frame portion and including fastening openings positioned to register with fastening openings in said housing, said C-shaped member including access areas registering with said fastening openings when said member is in its unlocked position so that fastening means may be passed through the access areas to secure the housing to the bracket means, swinging of said member to its locked position resulting in the eclipsing of said fastening openings by areas of the member adjacent to said access areas so that when the C-shaped member is in its locked position, fastening means within said fastening openings cannot be removed.

3. A bicycle lock according to claim 2, in which said housing includes a cable spool upon which said cable is coiled, said spool having gear teeth and being biased to coil up said cable within said housing, and in which said entrance opening for receiving said one end of said cable includes a spring biased pawl means positioned to be moved by said one end of said cable when inserted in said entrance opening to engage a gear tooth on said spool and lock the spool against rotation in a direction permitting the cable to be further pulled from said housing.

4. A bicycle lock including, in combination:
 a. a housing structure;
 b. a swingable member pivoted in said housing structure for movement from an unlocked position to a locked position wherein said member passes under a wheel tire and rim portion of said bicycle;
 c. a cable stored in said housing with one end exposed so that the cable may be pulled from the housing and looped about a stationary object, said housing including an entrance opening for receiving said one end of said cable;
 d. locking means in said housing for locking said swingable member in its locked position and said one end of said cable in said housing, said locking means including a rotatable cylinder-tumbler type key operated lock and wherein said member and said one end of said cable each have notches, said locking means further including bolt means biased towards said notches and receivable therein when said member is swung to its locked position and said one end of said cable is received in said entrance opening, said bolt means being coupled to said cylinder and responsive to rotation thereof to move away from said notches, whereby said one end of said cable and said swingable member are secured in their locked positions and whereby the same or unlocked simultaneously in response to a single rotative motion of said cylinder-tumbler type key operated lock; and
 e. bracket means for securing said housing to a frame portion of said bicycle adjacent to said wheel tire and rim portion, said bracket means being secured to said frame portion and including fastening openings positioned to register with fastening openings in said housing, said swingable member including access areas registering with said fastening openings when said member is in its unlocked position so that fastening means may be passed through the access areas to secure the housing to the bracket means, swinging of said swingable member to its locked position resulting in the eclipsing of said openings by areas of said member adjacent to said access areas so that when the swingable member is in its locked position, fastening means within said fastening openings cannot be removed.

* * * * *